United States Patent
Amma et al.

(10) Patent No.: US 11,554,985 B2
(45) Date of Patent: Jan. 17, 2023

(54) OPTICAL GLASS AND OPTICAL COMPONENT

(71) Applicant: AGC INC., Tokyo (JP)

(72) Inventors: Shinichi Amma, Tokyo (JP); Tatsuo Nagashima, Tokyo (JP)

(73) Assignee: AGC INC., Tokyo (JP)

( * ) Notice: Subject to any disclaimer, the term of this patent is extended or adjusted under 35 U.S.C. 154(b) by 258 days.

(21) Appl. No.: 16/717,867

(22) Filed: Dec. 17, 2019

(65) Prior Publication Data

US 2020/0123044 A1 Apr. 23, 2020

Related U.S. Application Data

(63) Continuation of application No. PCT/JP2018/022804, filed on Jun. 14, 2018.

(30) Foreign Application Priority Data

Jun. 23, 2017 (JP) .............................. JP2017-123207

(51) Int. Cl.
*C03C 4/00* (2006.01)
*C01G 53/04* (2006.01)
(Continued)

(52) U.S. Cl.
CPC ............ *C03C 4/0092* (2013.01); *C01G 53/04* (2013.01); *C03C 4/08* (2013.01); *C04B 35/12* (2013.01); *G02B 1/11* (2013.01); *G02B 6/0065* (2013.01)

(58) Field of Classification Search
CPC ........... C03C 4/0092; C03C 4/08; C03C 3/62; C03C 3/63; C03C 3/64; C03C 3/65;
(Continued)

(56) References Cited

U.S. PATENT DOCUMENTS

| 4,584,279 A | 4/1986 | Grabowski et al. |
| 2005/0164862 A1 | 7/2005 | Shiraishi |

(Continued)

FOREIGN PATENT DOCUMENTS

| CN | 101117267 A | 2/2008 |
| CN | 101817638 A | 9/2010 |

(Continued)

OTHER PUBLICATIONS

JP2016074558A—machine translation (Year: 2016).*

(Continued)

*Primary Examiner* — Karl E Group
*Assistant Examiner* — Cameron K Miller
(74) *Attorney, Agent, or Firm* — Foley & Lardner LLP

(57) ABSTRACT

An optical glass has a refractive index ($n_d$) of 1.64 or more. A P value represented by the following formula (1) is in a range of 7.0<P value<10.0: P value=log($A_{450} \times P_{450} + A_{550} \times P_{550} + A_{650} \times P_{650} + A_{750} \times P_{750}$) (1). $A_{450}$, $A_{550}$, $A_{650}$ and $A_{750}$ are absorbances of the optical glass with a plate thickness of 10 mm at a wavelength of 450 nm, 550 nm, 650 nm and 750 nm, respectively. $P_{450}$, $P_{550}$, $P_{650}$ and $P_{750}$ are radiances of light having a wavelength of 450 nm, 550 nm, 650 nm and 750 nm, respectively, at 1,300° C. according to Planck's radiation law. All of internal transmittances in terms of a 10-mm thickness at wavelengths of 450 nm, 550 nm, 650 nm and 750 nm are 91% or more.

19 Claims, 1 Drawing Sheet

(51) Int. Cl.
*C04B 35/12* (2006.01)
*F21V 8/00* (2006.01)
*G02B 1/11* (2015.01)
*C03C 4/08* (2006.01)

(58) Field of Classification Search
CPC .... C03C 3/66; C03C 3/67; C03C 3/68; C03C 3/15; C03C 3/155; C03C 3/14; C03C 3/145; C03C 3/04; C03C 3/062; C03C 3/066; C03C 3/068; C03C 3/076; C03C 3/078; C03C 3/083; C03C 3/085; C03C 3/087; C03C 3/089; C03C 3/091; C03C 3/093; C03C 3/095; C03C 3/097; C03C 3/16; C03C 3/17; C03C 3/19; C03C 3/21; C01G 53/04; C04B 35/12; G02B 1/11
See application file for complete search history.

(56) References Cited

U.S. PATENT DOCUMENTS

| | | | |
|---|---|---|---|
| 2006/0105900 | A1 | 5/2006 | Kasuga et al. |
| 2006/0189473 | A1 | 8/2006 | Endo |
| 2007/0015651 | A1 | 1/2007 | Endo |
| 2007/0149381 | A1 | 6/2007 | Wolff et al. |
| 2008/0231972 | A1 | 9/2008 | Hachitani et al. |
| 2008/0254965 | A1 | 10/2008 | Ishioka |
| 2009/0288450 | A1 | 11/2009 | Kasuga et al. |
| 2009/0325779 | A1 | 12/2009 | Negishi et al. |
| 2010/0029461 | A1 | 2/2010 | Morisada |
| 2010/0271830 | A1* | 10/2010 | Morisada ............... C03C 3/068 362/317 |
| 2012/0100981 | A1 | 4/2012 | Negishi et al. |
| 2012/0114904 | A1 | 5/2012 | Yanase et al. |
| 2012/0238436 | A1 | 9/2012 | Taguchi |
| 2013/0178354 | A1 | 7/2013 | Negishi et al. |
| 2014/0228197 | A1 | 8/2014 | Oogaki |
| 2015/0203397 | A1 | 7/2015 | Mikami et al. |
| 2015/0218041 | A1 | 8/2015 | Mikami et al. |
| 2015/0353407 | A1 | 12/2015 | Yamaguchi |
| 2016/0251257 | A1 | 9/2016 | Mikami et al. |
| 2016/0304390 | A1* | 10/2016 | Mikami ............... G02B 3/00 |
| 2017/0334765 | A1 | 11/2017 | Wada et al. |
| 2018/0050954 | A1 | 2/2018 | Wada et al. |
| 2018/0217317 | A1 | 8/2018 | Yanase et al. |
| 2018/0244559 | A1 | 8/2018 | Akiba et al. |
| 2018/0251395 | A1 | 9/2018 | Akiba et al. |
| 2019/0152841 | A1* | 5/2019 | Ritter ............... C03C 3/095 |

FOREIGN PATENT DOCUMENTS

| | | |
|---|---|---|
| CN | 102225844 A | 10/2011 |
| CN | 104876440 A | 9/2015 |
| EP | 2 218 694 A1 | 8/2010 |
| EP | 2 452 926 A1 | 5/2012 |
| JP | S58-125636 A | 7/1983 |
| JP | S60-131845 A | 7/1985 |
| JP | S61-168551 A | 7/1986 |
| JP | H06-056462 A | 3/1994 |
| JP | 2005-206433 A | 8/2005 |
| JP | 2006-137645 A | 6/2006 |
| JP | 2006-219365 A | 8/2006 |
| JP | 2006-225220 A | 8/2006 |
| JP | 2007-022846 A | 2/2007 |
| JP | 2007-169157 A | 7/2007 |
| JP | 2008-233547 A | 10/2008 |
| JP | 2009-073674 A | 4/2009 |
| JP | 2009-120485 A | 6/2009 |
| JP | 2009-203083 A | 9/2009 |
| JP | 2010-030879 A | 2/2010 |
| JP | 2010-105902 A | 5/2010 |
| JP | 2010-248046 A | 11/2010 |
| JP | 2010-265164 A | 11/2010 |
| JP | 2011-144069 A | 7/2011 |
| JP | 2011-213568 A | 10/2011 |
| JP | 2012-046392 A | 3/2012 |
| JP | 2012-162448 A | 8/2012 |
| JP | 2014-024748 A | 2/2014 |
| JP | 2014-511823 A | 5/2014 |
| JP | 2014-125408 A | 7/2014 |
| JP | 2015-059063 A | 3/2015 |
| JP | 2015-074572 A | 4/2015 |
| JP | 2015-193515 A | 11/2015 |
| JP | 2015-193516 A | 11/2015 |
| JP | 2016-074558 A | 5/2016 |
| JP | 2016074558 A * | 5/2016 |
| JP | 2016-124775 A | 7/2016 |
| JP | 2017-032673 A | 2/2017 |
| JP | 2017-105702 A | 6/2017 |
| JP | 2017-105703 A | 6/2017 |
| JP | 2017-154963 A | 9/2017 |
| JP | 2017-190280 A | 10/2017 |
| WO | WO-2008/126792 A1 | 10/2008 |
| WO | WO-2009/044874 A1 | 4/2009 |
| WO | WO-2010/038597 A1 | 4/2010 |
| WO | WO-2011/065097 A1 | 6/2011 |
| WO | WO-2012/029563 A1 | 3/2012 |
| WO | WO-2013/031385 A1 | 3/2013 |
| WO | WO-2016-148026 A1 | 9/2016 |
| WO | WO-2017/090645 A1 | 6/2017 |
| WO | WO-2017/090646 A1 | 6/2017 |

OTHER PUBLICATIONS

International Searching Authority, "International Search Report," issued in connection with International Patent Application No. PCT/JP2018/022804, dated Sep. 11, 2018.
International Searching Authority, "Written Opinion," issued in connection with International Patent Application No. PCT/JP2018/022804, dated Sep. 11, 2018.
Civil engineering project management higher education Twelfth Five-Year Plan materials (Chinese Edition), p. 240, Jul. 2013, with English translation.
Extended European Search Report dated Feb. 11, 2021 for corresponding European Patent Application No. 18820033.1.
Notice of Submission of Publication filed in corresponding Japanese Patent Application No. 2019-525531 (published on Jul. 6, 2021) (4 pages).
Office Action, dated May 16, 2022, issued in corresponding Japanese Patent Application No. JP2019/525531A.

* cited by examiner

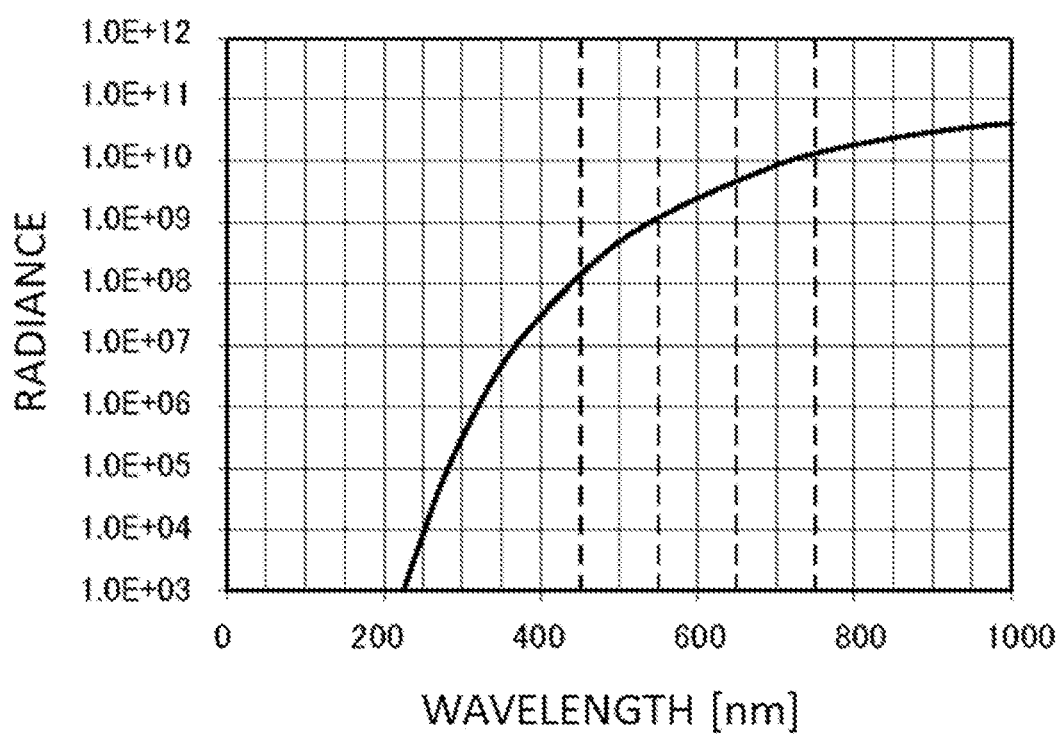

OPTICAL GLASS AND OPTICAL COMPONENT

CROSS-REFERENCE TO RELATED APPLICATIONS

This is a bypass continuation of PCT Application No. PCT/JP2018/022804, filed on Jun. 14, 2018, which claims priority to Japanese Application No. 2017-123207, filed on Jun. 23, 2017. The contents of these applications are hereby incorporated by reference in their entireties.

TECHNICAL FIELD

The present invention relates to an optical glass and an optical component.

BACKGROUND ART

The glass used for wearable equipment such as glasses with projector, glasses-type or goggle-type display, virtual reality and augmented reality display device, and virtual image display device is required to have high refractive index from the viewpoint of, for example, realizing a wide-angle and high-luminance/high-contrast image, enhancing the light guide properties, and facilitating the processing of diffraction grating. A small-sized imaging glass lens with a wide imaging angle of view has been conventionally used in applications such as vehicle-mounted camera and robot's visual sensor, and a high refractive index is required of such an imaging glass lens so as to photograph a wider range with a smaller lens.

With respect to the optical glass having a high refractive index, for example, as the glass contributing to enhancement of resolution of a display image and weight reduction of a device, a light guide plate having a predetermined refractive index and a predetermined plate thickness (see, for example, Patent Literature 1), and as the glass prevented from deterioration of spectral transmittance over time, an optical lens realizing a reduction in solarization by decreasing the content of $Sb_2O_3$ and adjusting the content of Pt component or Fe component (see, for example, Patent Literature 2), are known.

CITATION LIST

Patent Literature

Patent Literature 1: JP-A-2017-032673
Patent Literature 2: JP-A-2010-105902

SUMMARY OF INVENTION

Technical Problem

However, the optical glass in such applications is required to have a high light transmittance and configured to contain as little impurities, particularly, a component called a colored component, as possible and therefore, generally has a low heat ray absorption property. Consequently, in the case of employing, as the melting method at the production of glass, continuous melting in which glass is caused to absorb heat rays (infrared light, visible light) from a burner and thereby heated and melted, the glass sometimes cannot be sufficiently or efficiently melted.

More specifically, as glass absorbs a larger amount of heat rays from a burner, the glass is readily warmed and can be easily and sufficiently melted, and the production characteristics at the continuous melting are thereby enhanced. However, when the heat ray absorption property is high, the glass itself is colored in many cases and due to high refractive index, it is highly likely that the glass is not suitable as an optical glass requiring high light transmittance.

Accordingly, the present invention has been made to solve these problems, and an object thereof is to provide an optical glass having good production characteristics, ensuring high refractive index and good light transmittance and nevertheless exhibiting high meltability in continuous melting at the time of production.

Solution to Problem

The optical glass of the present invention is an optical glass having a refractive index $(n_d)$ of 1.64 or more, wherein a P value represented by the following formula (1) is in a range of 7.0<P value<10.0:

[Math. 1]

$$P \text{ value} = \log(A_{450} \times P_{450} + A_{550} \times P_{550} + A_{650} \times P_{650} A_{750} \times P_{750}) \quad (1),$$

provided that $A_{450}$ is an absorbance of the optical glass with a plate thickness of 10 mm at a wavelength of 450 nm, $P_{450}$ is a radiance of light having a wavelength of 450 nm at 1,300° C. according to Planck's radiation law, $A_{550}$ is an absorbance of the optical glass with a plate thickness of 10 mm at a wavelength of 550 nm, $P_{550}$ is a radiance of light having a wavelength of 550 nm at 1,300° C. according to Planck's radiation law, $A_{650}$ is an absorbance of the optical glass with a plate thickness of 10 mm at a wavelength of 650 nm, $P_{650}$ is a radiance of light having a wavelength of 650 nm at 1,300° C. according to Planck's radiation law, $A_{750}$ is an absorbance of the optical glass with a plate thickness of 10 mm at a wavelength of 750 nm, and $P_{750}$ is a radiance of light at 1,300° C. at a wavelength of 750 nm according to Planck's radiation law, and all of internal transmittances in terms of a 10-mm thickness at wavelengths of 450 nm, 550 nm, 650 nm and 750 nm are 91% or more.

In addition, the optical component of the present invention is characterized by using the optical glass of the present invention.

Advantageous Effects of the Invention

According to the optical glass and optical component of the present invention, a product having high refractive index and good light transmittance can be provided. At the time of production thereof, it is ensured that meltability in continuous melting is high, production characteristics are good, and the production efficiency can be enhanced.

BRIEF DESCRIPTION OF DRAWINGS

The FIGURE is a graph illustrating the spectral radiance at 1,300° C. according to Planck's radiation law.

DESCRIPTION OF EMBODIMENTS

The embodiments of the optical glass and optical component of the present invention are described below.

The optical glass of this embodiment has, as described above, predetermined refractive index $(n_d)$, P value and light transmittance. These properties are described in sequence.

The optical glass of this embodiment has a high refractive index $(n_d)$ of 1.64 or more. Since the refractive index $(n_d)$ is 1.64 or more, the optical glass of this embodiment is suitable as an optical glass used for wearable equipment from the viewpoint of, for example, realizing a wide-angle and high-luminance/high-contrast image, enhancing the light guide properties, and facilitating the processing of diffraction grating. The optical lens is suitable as a small-sized imaging glass lens with a wide imaging angle of view used in applications such as vehicle-mounted camera and robot's visual sensor, because a wider range is photographed with a smaller lens. The refractive index ($n_d$) is preferably 1.68 or more, more preferably 1.72 or more, still more preferably 1.76 or more, yet still more preferably 1.78 or more.

On the other hand, if the refractive index ($n_d$) is too large, the glass tends to readily undergo an increase in the density and also a rise in the devitrification temperature. The refractive index ($n_d$) is preferably 1.85 or less, more preferably 1.83 or less, still more preferably 1.82 or less, yet still more preferably 1.81 or less.

The optical glass of this embodiment has a predetermined P value. Here, the P value indicates a value calculated by taking a common logarithm ($\log_{10}$) of the sum of values obtained by adding up, for each wavelength, the absorbance of the optical glass at respective wavelengths of 450 nm, 550 nm, 650 nm and 750 nm and the radiance of light at respective wavelengths under the Planck's radiation law.

That is, the P value as used in the description is represented by the following formula (1):

[Math. 2]

$$P \text{ value} = \log(A_{450} \times P_{450} + A_{550} \times P_{550} + A_{650} \times P_{650} + A_{750} \times P_{750}) \quad (1)$$

(wherein $A_{450}$, $P_{450}$, $A_{550}$, $P_{550}$, $A_{650}$, $P_{650}$, $A_{750}$ and $P_{750}$ are the same as above).

The Planck's radiation law represents spectral radiance of electromagnetic radiation from a black body and is indicated as a function of frequency and temperature. For example, the Planck's radiation law at 1,300° C. is illustrated in the FIGURE. The intensity increases as it goes to the longer wavelength side. As for the radiance per unit time, surface area, solid angle and wavelength in Planck's radiation law (1,300° C.), the radiance at a wavelength of 450 nm is $1.2 \times 10^9$ (J/s·m²·sr·m), the radiance at 550 nm is $4.7 \times 10^9$ (J/s·m²·sr·m), the radiance at 650 nm is $1.2 \times 10^{10}$ (J/s·m²·sr·m), and the radiance at 750 nm is $2.4 \times 10^{10}$ (J/s·m²·sr·m).

The absorbance is the absorbance of the optical glass and varies depending on the composition of the glass, but as the absorbance is higher, the heat ray absorption property increases.

Moe specifically, with respect to melting of the glass, the heat ray absorption property at a specific wavelength can be evaluated by taking into account the Planck's radiation law and absorbance. In this embodiment, the heat ray absorption property of the optical glass is evaluated by taking into account, as the wavelength, four wavelengths of 450 nm, 550 nm, 650 nm and 750 nm.

In the case of melting a glass containing Nb or Ti which are a component for making a highly refractive optical glass, in order to reduce the coloration due to reduction of such a component, it is a common practice to let the melting atmosphere be an oxidative atmosphere. In this case, elements having a heat ray absorption property, such as Fe, Cr, Ni and Pt, have absorption on the shorter wavelength side than 750 nm and have an absorption property at different wavelengths from one another.

On the other hand, according to Planck's radiation law, the radiance of heat rays is weaker as it goes to the shorter wavelength side. Therefore, in comparing the heat ray absorption property during melting, there is substantially no problem when the radiance on the longer wavelength side than 450 nm is taken into account.

For these reasons, the heat ray absorption property as the optical glass can be evaluated by comprehensively considering, with respect to the wavelength between 450 nm and 750 nm, the heat ray absorption property at each wavelength at intervals of 100 nm. When the P value of formula (1) is within a predetermined range, the melting property of the glass is relatively good.

In this embodiment, the P value is required to be in the range satisfying 7<P value<10 and is preferably in the range of 7.5<P value<9.5, more preferably 8<P value<9.

Here, it is preferable to satisfy at least one, more preferably two or more, still more preferably all of, the ranges that the absorbance $A_{450}$ of the optical glass is in the range of $0.025 < A_{450} < 1.000$, the absorbance $A_{550}$ of the optical glass is in the range of $0.003 < A_{550} < 0.500$, the absorbance $A_{650}$ of the optical glass is in the range of $0.003 < A_{650} < 0.500$, and the absorbance $A_{750}$ of the optical glass is in the range of $0.003 < A_{750} < 0.500$. These absorbances affect the heat ray absorption property in cooperation with the Planck's radiation law as described above. With respect to the ranges above, in the case of satisfying one range, a range on the long wavelength side is preferably satisfied.

In this embodiment, the absorbance indicates the degree of light intensity attenuation when an optical glass having a plate thickness of 10 mm is irradiated with light, and is represented by a common logarithm of the ratio of transmitted light intensity to incident light intensity.

In the optical glass of this embodiment, all of internal transmittances in terms of a 10-mm thickness at wavelengths of 450 nm, 550 nm, 650 nm and 750 nm are 91% or more. An optical glass used for wearable equipment, etc. is required to have a high internal transmittance and, among others, a high internal transmittance in the wavelength region of visible light.

In this embodiment, contradictory properties of high heat ray absorption property and high internal transmittance are well balanced so that both properties can fall in practical ranges.

Here, the internal transmittance $\tau$ is a transmittance excluding the surface loss on the incoming side and outgoing side and is determined by calculation using the measured transmittance values of a pair of samples differing in the thickness, with each value including the surface reflection loss. The internal transmittance as referred to in the this description can be worked out by calculation using the following formula (2) from the transmittances $T_{1\ mm}$ and $T_{10\ mm}$ measured for samples having a thickness of 1 mm and a thickness of 10 mm at respective measurement wavelengths of 450 nm, 550 nm, 650 nm and 750 nm.

[Math. 3]

$$\log\tau = \frac{\log T_{10\ mm} - \log T_{1\ mm}}{9\ mm} \times 10 \quad (2)$$

($\tau$ is the internal transmittance in the sample having a thickness of 10 mm, $T_{1\ mm}$ is the transmittance including surface reflection loss obtained when the sample thickness is 1 mm, and $T_{10\ mm}$ is the transmittance including surface reflection loss obtained when the sample thickness is 10 mm).

Here, with respect to the internal transmittance of the optical glass in this embodiment, all of the internal transmittance $\tau_{450}$ at a wavelength of 450 nm, the internal transmittance $\tau_{550}$ at a wavelength of 550 nm, the internal transmittance $\tau_{650}$ at a wavelength of 650 nm, and the internal transmittance $\tau_{750}$ at a wavelength of 750 nm are 91% or more.

The reason why the above-described four wavelengths are employed is as follows.

In an optical component of wearable equipment, etc., an image is sometimes projected by guiding visible light into the glass used. At this time, if the transmittance is reduced in a partial wavelength range of visible light, the image projected is colored to deteriorate the color reproducibility. Accordingly, high transmittance needs to be realized in the entire visible light region.

As the wavelength at which the transmittance is measured, an element for imparting a high refractive index to the glass, such as Nb, Ti and Bi, or an element contained for heat ray absorption adjustment, such as Fe, Cr and Ni, has absorption on the short wavelength side ranging from ultraviolet region to visible light region and therefore, measurement at 450 nm located at an end of the short wavelength side, which is a wavelength detectable by human eye, is effective in evaluating the properties. Since absorption attributable to Cr appears at 650 nm, measurement at this wavelength is effective in evaluating the properties. With respect to other wavelengths, a wavelength suitable for optical glass applications by controlling coloration was studied. As a result, it was found that confirmation of the transmittance at 750 nm located at an end of the long wavelength side of the visible light region and at 550 nm as an intermediate wavelength of the above-described evaluation wavelengths is effective in determining whether or not coloration can be controlled in the visible light region, i.e., whether or not the glass is suitable for optical glass applications.

Furthermore, in the optical glass of this embodiment, the specific gravity is preferably 4.0 or less. With this specific gravity, when the optical glass of this embodiment is used for wearable equipment, comfortable wearing feel can be given to users, and when used for a vehicle-mounted camera, a robot's visual sensor, etc., the weight of the device as a whole can be reduced. The specific gravity (d) is preferably 3.8 or less, more preferably 3.6 or less, still more preferably 3.5 or less, yet still more preferably 3.4 or less.

On the other hand, in the optical glass of this embodiment, in order to render the glass surface insusceptible to scratches, the specific gravity (d) is preferably 2.0 or more. The specific gravity (d) is more preferably 2.2 or more, still more preferably 2.3 or more, yet still more preferably 2.4 or more, even yet still more preferably 2.7 or more.

With respect to the viscosity of the optical glass of this embodiment, the temperature $T_2$ at which log $\eta=2$ is preferably in the range of 950 to 1,200° C. (here, $\eta$ is the viscosity (dPa·s) when the shear stress is 0). $T_2$ is a reference temperature of meltability. If $T_2$ of the glass is too high, the glass needs to be melted at a high temperature. In the case of a high-refractive-index glass, the visible light transmittance particularly on the short wavelength side may be lowered. $T_2$ is more preferably 1,180° C. or less, still more preferably 1,150° C. or less, yet still more preferably 1,130° C. or less, even yet still more preferably 1,110° C. or less.

On the other hand, if $T_2$ is too low, there is a problem that the viscosity curve is steep and the viscosity at the time of production is difficult to control. When the viscosity of the optical glass of this embodiment is adjusted to $T_2$ in the range above, the production characteristics are improved. $T_2$ is preferably 970° C. or more, more preferably 990° C. or more, still more preferably 1,010° C. or more, yet still more preferably 1,030° C. or more.

The devitrification temperature of the optical glass of this embodiment is preferably 1,200° C. or less. When the optical glass has such a property, devitrification of the glass at the time of forming can be prevented, and the formability in the forming method having high production characteristics, such as float method, fusion method and roll-out method, is improved. The devitrification temperature is more preferably 1,175° C. or less, still more preferably 1,150° C. or less, yet still more preferably 1,125° C. or less, even yet still more preferably 1,100° C. or less. Here, the devitrification temperature is the lowest temperature at which when the glass heated and melted is cooled by natural cooling, crystals having a long side or major axis of 1 μm or more are not observed at the surface and inside of the glass.

The Young's modulus (E) of the optical glass of this embodiment is preferably 60 GPa or more. Having such a property is advantageous in that when the optical glass is used as a thin glass plate for wearable equipment or used as a lens for a vehicle-mounted camera, a robot's visual sensor, etc., deflection is less likely to occur. The E is more preferably 70 GPa or more, still more preferably 80 GPa or more, yet still more preferably 85 GPa or more, even yet still more preferably 90 GPa or more.

The glass transition temperature (Tg) of the optical glass of this embodiment is preferably in the range of 500 to 700° C. When the optical glass of this embodiment has Tg in the range above, the formability in press molding and redraw forming is improved. Tg is more preferably from 520 to 680° C., still more preferably from 540 to 660° C., yet still more preferably from 560 to 640° C., even yet still more preferably from 570 to 620° C. Tg can be measured, for example, by a thermal expansion method.

The Abbe number ($v_d$) of the optical glass of this embodiment is preferably 50 or less. Specifically, in the case of applying the optical glass of this embodiment to a glass plate such as light guide plate, when $v_d$ is low and in the range above, the optical design of wearable equipment is facilitated. $v_d$ is more preferably 46 or less, still more preferably 42 or less, yet still more preferably 38 or less, even yet still more preferably 34 or less.

The lower limit of $v_d$ of the optical glass of this embodiment is not particularly limited, but it is basically 10 or more, specifically 15 or more, more specifically 20 or more.

In the optical glass of this embodiment, the coefficient of thermal expansion (a) at 50 to 350° C. is preferably from 50 to 150 ($\times 10^{-7}$/K). When the optical glass of this embodiment has a in the range above, expansion matching to peripheral members is improved. The a is more preferably from 60 to 135 ($\times 10^{-7}$/K), still more preferably from 70 to 120 ($\times 10^{-7}$/K), yet still more preferably from 80 to 105 ($\times 10^{-7}$/K), even yet still more preferably from 90 to 100 ($\times 10^{-7}$/K).

The optical glass of this embodiment is preferably a glass plate having a thickness of 0.01 to 2.0 mm. When the thickness is 0.01 mm or more, breakage during handling or processing of the optical glass can be prevented. In addition, deflection due to own weight of the optical glass can be reduced. The thickness is more preferably 0.1 mm or more, still more preferably 0.3 mm or more, yet still more preferably 0.5 mm or more, even yet still more preferably 0.7 mm or more. On the other hand, when the thickness is 2.0 mm or less, an optical element using the optical glass can be reduced in weight. The thickness is more preferably 1.5 mm or less, still more preferably 1.0 mm or less, yet still more preferably 0.8 mm or less, even yet still more preferably 0.6 mm or less.

The area of one main surface of the optical glass of this embodiment is, in the case of a glass plate, preferably 8 cm² or more. When the area is 8 cm² or more, a large number of optical elements can be set, and the productivity is enhanced. The area is more preferably 30 cm² or more, still more preferably 170 cm² or more, yet still more preferably 300 cm² or more, even yet still more preferably 1,000 cm² or more. On the other hand, when the area is 6,500 cm² or less, handling of the glass plate is facilitated, and the breakage during handling or processing of the glass plate can be prevented. The area is more preferably 4,500 cm² or less, still more preferably 4,000 cm² or less, yet still more preferably 3,000 cm² or less, even yet still more preferably 2,000 cm² or less.

The surface roughness Ra of one main surface of the optical glass of this embodiment is preferably 2 nm or less. When Ra is in this range, a nanostructure having the desired shape can be formed on one main surface by using imprint technology, etc., and desired light guide properties are also obtained. Ra is more preferably 1.7 nm or less, still more preferably 1.4 nm or less, yet still more preferably 1.2 nm or less, even yet still more preferably 1 nm or less. Here, the surface roughness Ra is an arithmetic mean roughness defined in JIS B0601 (2001). In the this description, the surface area is a value obtained by measuring three different areas of 10 μm×10 μm by using an atomic force microscope (AFM) and averaging the results.

The solarization of the optical glass of this embodiment is preferably 3.0% or less. Within this range, the equipment having incorporated thereinto the optical glass can be resistant to deterioration of the color balance even when used for a long period of time. Above all, as the operating temperature is higher, the solarization is greatly reduced. Therefore, when the equipment is used at high temperatures, for example, mounted to a vehicle, the optical glass of this embodiment is particularly useful. The solarization is preferably 2.5% or less, more preferably 2.3% or less, still more preferably 2.0% or less. The "solarization" as used in this description represents a degraded amount of spectral transmittance at 450 nm when the glass is irradiated with an ultraviolet ray. Specifically, the solarization is determined by measuring the spectral transmittance before and after irradiation with light from a high-pressure mercury, etc. according to Japan Optical Glass Industrial Standards JOGIS04-1994, "Method of measuring solarization of optical glass".

[Glass Components]

One embodiment of the composition range of each component that can be contained in the optical glass of this embodiment is described in detail below. In this description, unless otherwise indicated, the content of each component is represented by mass % relative to the total mass of the glass matrix composition based on oxides. Here, the glass matrix composition are components excluding the heat ray absorption component described below, $Sb_2O_3$ and $SnO_2$.

The matrix composition satisfying the properties of high refractive index, good light transmittance and high meltability in the optical glass of this embodiment includes, for example, a composition containing, in mass % based on oxides, as the glass forming component, from 5 to 80 mass % of at least one selected from the group consisting of $SiO_2$, $B_2O_3$ and $P_2O_5$, as the modifier oxide, 5 to 70 mass % in a total amount of at least one oxide selected from the group consisting of MgO, CaO, SrO, BaO, ZnO, $Li_2O$, $Na_2O$, $K_2O$, $Cs_2O$ and $Ln_2O_3$ (Ln is at least one selected from the group consisting of Y, La, Gd, Yb and Lu), and as the intermediate oxide, 0 to 50 mass % in a total amount of at least one oxide selected from the group consisting of $Al_2O_3$, $TiO_2$, $ZrO_2$, $WO_3$, $Bi_2O_3$, $TeO_2$, $Ta_2O_5$ and $Nb_2O_5$.

Examples of the optical glass having such a composition include, specifically, (1) an La—B-based optical glass, (2) an $SiO_2$-based optical glass, and (3) a $P_2O_5$-based optical glass. In the description of contents in the glass composition, simple expressions "%" and "ppm" mean "mass %" and "ppm by mass" unless specifically stated.

Examples of (1) the La—B-based optical glass include a glass containing from 5 to 70% of $La_2O_3$ and from 5 to 70% of $B_2O_3$ assuming the total of the matrix composition is 100%.

By containing 5% or more of $La_2O_3$ component, a desired high refractive index can be achieved, and the dispersion can be reduced (the Abbe number can be increased). Accordingly, the lower limit of the content of $La_2O_3$ component is preferably 10%, more preferably 15%, still more preferably 20%, yet still more preferably 30%.

On the other hand, when the content of $La_2O_3$ component is 70% or less, reduction in the meltability of the glass is prevented, and the devitrification resistance of the glass is enhanced. Accordingly, the upper limit of the content of $La_2O_3$ component is preferably 60%, more preferably 50%, still more preferably 40%, yet still more preferably 30%.

$B_2O_3$ is a glass forming component, and the $B_2O_3$ content is preferably from 5 to 70% assuming the total of the matrix composition is 100%.

By containing 5% or more of $B_2O_3$ component, the devitrification resistance of the glass is enhanced, and the dispersion of the glass can be reduced. Accordingly, the lower limit of the content of $B_2O_3$ component is preferably 10%, more preferably 20%, still more preferably 35%.

On the other hand, when the content of $B_2O_3$ component is 70% or less, a larger refractive index can be readily obtained, and deterioration of the chemical durability can be prevented. Accordingly, the upper limit of the content of $B_2O_3$ component is preferably 60%, more preferably 50%, still more preferably 40%, yet still more preferably 30%.

MgO is an optional component. The MgO content is preferably from 0 to 20% assuming the total of the matrix composition is 100%. By containing the MgO component, the mechanical strength of the glass can be enhanced. The MgO content is more preferably 1% or more, still more preferably 3% or more, yet still more preferably 5% or more, even yet still more preferably 8% or more. When the MgO content is 20% or less, the devitrification temperature is lowered, and preferable production characteristics are obtained. The MgO content is more preferably 15% or less, still more preferably 10% or less, yet still more preferably 5% or less, even yet still more preferably 3% or less.

CaO is an optional component. The CaO content is preferably from 0 to 30% assuming the total of the matrix composition is 100%. By containing the CaO component, the chemical durability of the glass can be enhanced. The CaO content is more preferably 1% or more, still more preferably 3% or more, yet still more preferably 5% or more, even yet still more preferably 10% or more. When the CaO content is 30% or less, the devitrification temperature is lowered, and preferable production characteristics are obtained. The CaO content is more preferably 20% or less, still more preferably 15% or less, yet still more preferably 10% or less, even yet still more preferably 5% or less.

SrO is an optional component. The SrO content is preferably from 0 to 30% assuming the total of the matrix composition is 100%. By containing the SrO component, the refractive index of the glass can be increased. The SrO content is more preferably 1% or more, still more preferably 3% or more, yet still more preferably 5% or more, even yet still more preferably 10% or more. When the SrO content is 30% or less, the devitrification temperature is lowered, and preferable production characteristics are obtained. The SrO content is more preferably 20% or less, still more preferably 15% or less, yet still more preferably 10% or less, even yet still more preferably 5% or less.

BaO is an optional component. The BaO content is preferably from 0 to 40% assuming the total of the matrix composition is 100%. By containing the BaO component, the refractive index of the glass can be increased. The BaO content is more preferably 1% or more, still more preferably 3% or more, yet still more preferably 5% or more, even yet still more preferably 10% or more. When the BaO content is 40% or less, the devitrification temperature is lowered, and preferable production characteristics are obtained. The BaO content is more preferably 30% or less, still more preferably 20% or less, yet still more preferably 15% or less, even yet still more preferably 10% or less.

ZnO is an optional component. The ZnO content is preferably from 0 to 30% assuming the total of the matrix composition is 100%. By containing the ZnO component, the refractive index of the glass can be increased. The ZnO content is more preferably 1% or more, still more preferably 3% or more, yet still more preferably 5% or more, even yet still more preferably 10% or more. When the ZnO content is 30% or less, the devitrification temperature is lowered, and preferable production characteristics are obtained. The ZnO content is more preferably 20% or less, still more preferably 15% or less, yet still more preferably 10% or less, even yet still more preferably 5% or less.

$Li_2O$ is an optional component. The $Li_2O$ content is preferably from 0 to 15% assuming the total of the matrix composition is 100%. When $Li_2O$ is contained, the strength (Kc) and crack resistance (CIL) can be enhanced. The $Li_2O$ content is more preferably 0.5% or more, still more preferably 1% or more, yet still more preferably 3% or more, even yet still more preferably 5% or more. On the other hand, when the $Li_2O$ content is 15% or less, the devitrification temperature is lowered, and preferable production characteristics are obtained. The $Li_2O$ content is preferably 10% or less, more preferably 7% or less, still more preferably 5% or less, yet still more preferably 4% or less.

$Na_2O$ is an optional component. The $Na_2O$ content is from 0 to 20% assuming the total of the matrix composition is 100%. When the $Na_2O$ content is 20% or less, good crack resistance is obtained. The $Na_2O$ content is preferably 15% or less, more preferably 10% or less, still more preferably 7% or less, yet still more preferably 5% or less. In the case where the optical glass of this embodiment contains $Na_2O$, the devitrification temperature is lowered, and preferable production characteristics are obtained. The content thereof is preferably 0.5% or more, more preferably 1% or more, still more preferably 2% or more, yet still more preferably 3% or more.

$K_2O$ is an optional component. The $K_2O$ content is from 0 to 20% assuming the total of the matrix composition is 100%. When the $K_2O$ content is 20% or less, good crack resistance is obtained. The $K_2O$ content is preferably 15% or less, more preferably 10% or less, still more preferably 7% or less. In the case where the optical glass of this embodiment contains $K_2O$, the devitrification temperature is lowered, and preferable production characteristics are obtained. The content thereof is preferably 0.5% or more, more preferably 1% or more, still more preferably 2% or more, yet still more preferably 3% or more.

The optical glass of this embodiment can contain, as an optional component, alkali metal components ($Li_2O+Na_2O+K_2O$). The content of $Li_2O+Na_2O+K_2O$ is from 0 to 20% assuming the total of the matrix composition is 100%. When $Li_2O+Na_2O+K_2O$ is 2% or more, $T_2$ is readily lowered, the melting temperature is low, and coloration is controlled. The content of $Li_2O+Na_2O+K_2O$ is preferably 4% or more, more preferably 6% or more, still more preferably 8% or more, yet still more preferably 10% or more. When the content of $Li_2O+Na_2O+K_2O$ is 20% or less, the devitrification temperature is lowered, and preferable production characteristics are obtained. The content of $Li_2O+Na_2O+K_2O$ is preferably 15% or less, more preferably 10% or less, still more preferably 8% or less, yet still more preferably 6% or less.

In the optical glass of this embodiment, among alkali metal components ($Li_2O$, $Na_2O$, $K_2O$), $Li_2O$ is a component capable of enhancing the strength of the glass, but if its amount is too large, $T_2$ is readily lowered, and devitrification is likely to occur. Accordingly, in the optical glass of this embodiment, the value of the ratio $Li_2O/(Li_2O+Na_2O+K_2O)$ is preferably 0.45 or less in mass % based on oxides. When $Li_2O/(Li_2O+Na_2O+K_2O)$ is 0.45 or less, $T_2$ is likely to be high, devitrification is less likely to occur, and ease of formability of the glass is enhanced. $Li_2O/(Li_2O+Na_2O+K_2O)$ is more preferably 0.4 or less, still more preferably 0.35 or less, yet still more preferably 0.3 or less.

$Cs_2O$ is an optional component. The $Cs_2O$ content is preferably from 0 to 20% assuming the total of the matrix composition is 100%. When the $Cs_2O$ content is more than 0%, the devitrification temperature is lowered, and preferable production characteristics are obtained. In the case where the optical glass of this invention contains $Cs_2O$, its content is preferably 0.5% or more, more preferably 1% or more, still more preferably 2% or more, yet still more preferably 3% or more. On the other hand, when the $Cs_2O$ content is 20% or less, good crack resistance is obtained. The $Cs_2O$ content is preferably 15% or less, more preferably 10% or less, still more preferably 7% or less.

$Ln_2O_3$ (Ln is at least one selected from the group consisting of Y, La, Gd, Yb and Lu) is an optional component. The content in terms of the total amount of $Ln_2O_3$ is from 0 to 55% assuming the total of the matrix composition is 100%. When $Ln_2O_3$ is contained, the refractive index of the glass can be increased. The content in terms of the total amount of $Ln_2O_3$ is preferably 1% or more, more preferably 5% or more, still more preferably 10% or more, yet still more preferably 15% or more.

When the $Ln_2O_3$ content is 55% or less, the devitrification temperature can be lowered, and the raw material cost can be reduced. Accordingly, the content in terms of the total amount is preferably 55% or less, more preferably 25% or less, still more preferably 15% or less, yet still more preferably 10% or less.

$Al_2O_3$ is an optional component. The $Al_2O_3$ content is from 0 to 55% assuming the total of the matrix composition is 100%. When $Al_2O_3$ is contained, the strength of the glass can be increased, and the stability of the glass can be enhanced. The $Al_2O_3$ content is preferably 1% or more, more preferably 3% or more, still more preferably 5% or more, yet still more preferably 8% or more.

When the $Al_2O_3$ content is 55% or less, the devitrification temperature is lowered, and preferable production characteristics are obtained. The $Al_2O_3$ content is preferably 15% or less, and it is preferred to have an $Al_2O_3$ content of 10% or less, furthermore, an $Al_2O_3$ content of 8% or less, particularly, an $Al_2O_3$ content of 5% or less.

$TiO_2$ is an optional component. The $TiO_2$ content is from 0 to 55% assuming the total of the matrix composition is 100%. When $TiO_2$ is contained, the refractive index of the glass can be increased, and the stability of the glass can be enhanced. The $TiO_2$ content is preferably 1% or more, more preferably 5% or more, still more preferably 10% or more, yet still more preferably 15% or more.

When the $TiO_2$ content is 55% or less, the devitrification temperature is lowered, and coloration of the glass is controlled. The $TiO_2$ content is preferably 35% or less, more preferably 25% or less, still more preferably 15% or less, yet still more preferably 10% or less.

$ZrO_2$ is an optional component. The $ZrO_2$ content is from 0 to 55% assuming the total of the matrix composition is 100%. When $ZrO_2$ is contained, the refractive index of the glass can be increased, and the chemical durability can be enhanced. The $ZrO_2$ content is preferably 1% or more, more preferably 5% or more, still more preferably 10% or more, yet still more preferably 15% or more.

When the $ZrO_2$ content is 55% or less, the devitrification temperature is lowered, and preferable production characteristics are obtained. The $ZrO_2$ content is preferably 30% or less, more preferably 20% or less, still more preferably 15% or less, yet still more preferably 10% or less.

$WO_3$ is an optional component. The $WO_3$ content is from 0 to 55% assuming the total of the matrix composition is 100%. When $WO_3$ is contained, the refractive index of the glass can be increased. The $WO_3$ content is preferably 1% or more, more preferably 3% or more, still more preferably 5% or more, yet still more preferably 10% or more.

When the $WO_3$ content is 55% or less, the devitrification temperature is lowered, and coloration of the glass is controlled. The $WO_3$ content is preferably 30% or less, more preferably 20% or less, still more preferably 15% or less, yet still more preferably 10% or less.

$Bi_2O_3$ is an optional component. The $Bi_2O_3$ content is from 0 to 55% assuming the total of the matrix composition is 100%. When $Bi_2O_3$ is contained, the refractive index of the glass can be increased. The $Bi_2O_3$ content is preferably 1% or more, more preferably 5% or more, still more preferably 5% or more, yet still more preferably 10% or more.

When the $Bi_2O_3$ content is 55% or less, the devitrification temperature is lowered, and coloration of the glass can is controlled. The $Bi_2O_3$ content is preferably 35% or less, more preferably 25% or less, still more preferably 15% or less, yet still more preferably 10% or less.

$TeO_2$ is an optional component. The $TeO_2$ content is from 0 to 30% assuming the total of the matrix composition is 100%. When $TeO_2$ is contained, the refractive index of the glass can be increased. The $TeO_2$ content is preferably 1% or more, more preferably 5% or more, still more preferably 10% or more, yet still more preferably 15% or more.

When the $TeO_2$ content is 55% or less, the devitrification temperature can be lowered and moreover, the material cost can be reduced. The $TeO_2$ content is preferably 30% or less, more preferably 20% or less, still more preferably 15% or less, yet still more preferably 10% or less.

$Ta_2O_5$ is an optional component. The $Ta_2O_5$ content is from 0 to 30% assuming the total of the matrix composition is 100%. When $Ta_2O_5$ is contained, the refractive index of the glass can be increased. The $Ta_2O_5$ content is preferably 1% or more, more preferably 5% or more, still more preferably 10% or more, yet still more preferably 15% or more.

When the $Ta_2O_5$ content is 30% or less, the devitrification temperature can be lowered and moreover, the material cost can be reduced. The $Ta_2O_5$ content is preferably 25% or less, more preferably 20% or less, still more preferably 15% or less, yet still more preferably 10% or less.

$Nb_2O_5$ is an optional component. The $Nb_2O_5$ content is from 0 to 55% assuming the total of the matrix composition is 100%. When $Nb_2O_5$ is contained, the refractive index of the glass can be increased. The $Nb_2O_5$ content is preferably 5% or more, more preferably 10% or more, still more preferably 15% or more, yet still more preferably 30% or more. When the $Nb_2O_5$ content is 55% or less, the devitrification temperature can be lowered and moreover, the material cost can be reduced. The $Nb_2O_5$ content is preferably 35% or less, more preferably 25% or less, still more preferably 15% or less, yet still more preferably 10% or less.

Examples of (2) the $SiO_2$-based optical glass include a glass containing from 10 to 70% of $SiO_2$ and containing, as the high refractive index component, 1% or more of at least one selected from the group consisting of $Nb_2O_5$, $Ta_2O_5$, $Li_2O$, SrO, BaO, $TiO_2$, $ZrO_2$, $WO_3$, $Bi_2O_3$, $TeO_2$ and $Ln_2O_3$ (Ln is at least one selected from the group consisting of Y, La, Gd, Yb and Lu).

$SiO_2$ is a glass forming component. The $SiO_2$ content is from 10 to 70% assuming the total of the matrix composition is 100%. When the $SiO_2$ content is 10% or more, the viscosity of the glass can let the temperature $T_2$ at which log η=2 be in the preferred range, high strength and crack resistance are imparted to the glass, and the stability and chemical durability of the glass can be enhanced. The $SiO_2$ content is preferably 15% or more, more preferably 20% or more, still more preferably 25% or more. On the other hand, when the $SiO_2$ content is 70% or less, a component for obtaining a high refractive index can be contained. The $SiO_2$ content is preferably 60% or less, more preferably 50% or less, still more preferably 40% or less.

$Nb_2O_5$ is an optional component. When the $Nb_2O_5$ content is 5% or more assuming the total of the matrix composition is 100%, the refractive index of the glass can be increased and the Abbe number ($v_d$) can be reduced. The $Nb_2O_5$ content is more preferably 15% or more, still more preferably 25% or more, yet still more preferably 30% or more.

When the $Nb_2O_5$ content is 70% or less, the devitrification temperature can be lowered and moreover, the raw material cost can be reduced. The $Nb_2O_5$ content is preferably 60% or less, more preferably 55% or less, still more preferably 50% or less.

$Ta_2O_5$ is an optional component. The $Ta_2O_5$ content is from 0 to 30% assuming the total of the matrix composition is 100%. When the $Ta_2O_5$ content is 1% or more, the refractive index can be increased. The $Ta_2O_5$ content is more preferably 5% or more, still more preferably 10% or more, yet still more preferably 15% or more.

When the $Ta_2O_5$ content is 30% or less, the devitrification temperature can be lowered and moreover, the raw material cost can be reduced. The $Ta_2O_5$ content is preferably 25% or less, more preferably 20% or less, still more preferably 15% or less, yet still more preferably 10% or less.

The optical glass of this embodiment can contain, as an optional component, alkali metal components ($Li_2O+Na_2O+K_2O$). The content of $Li_2O+Na_2O+K_2O$ is from 0 to 20% assuming the total of the matrix composition is 100%. When $Li_2O+Na_2O+K_2O$ is 2% or more, $T_2$ is readily lowered, the melting temperature is low, and coloration is controlled. The content of $Li_2O+Na_2O+K_2O$ is preferably 4% or more, more preferably 6% or more, still more preferably 8% or more, yet still more preferably 10% or more. When the content of $Li_2O+Na_2O+K_2O$ is 20% or less, the devitrification temperature is lowered, and preferable production characteristics are obtained. The content of $Li_2O+Na_2O+K_2O$ is preferably 15% or less, more preferably 10% or less, still more preferably 8% or less, yet still more preferably 6% or less.

In the optical glass of this embodiment, among alkali metal components ($Li_2O$, $Na_2O$, $K_2O$), $Li_2O$ is a component capable of enhancing the strength of the glass, but if its amount is too large, $T_2$ is readily lowered, and devitrification is likely to occur.

Accordingly, in the optical glass of this embodiment, the value of the ratio $Li_2O/(Li_2O+Na_2O+K_2O)$ is preferably 0.45 or less in mass % based on oxides. When $Li_2O/(Li_2O+Na_2O+K_2O)$ is 0.45 or less, $T_2$ is likely to be high, devitrification is less likely to occur, and ease of formability of the glass is enhanced. $Li_2O/(Li_2O+Na_2O+K_2O)$ is more preferably 0.4 or less, still more preferably 0.35 or less, yet still more preferably 0.3 or less.

$Li_2O$ is an optional component. The $Li_2O$ content is preferably from 0 to 15% assuming the total of the matrix composition is 100%. When $Li_2O$ is contained, the strength (Kc) and crack resistance (CIL) can be enhanced. The $Li_2O$ content is more preferably 0.5% or more, still more preferably 1% or more, yet still more preferably 3% or more, even yet still more preferably 5% or more. On the other hand, when the $Li_2O$ content is 15% or less, the devitrification temperature is lowered, and preferable production characteristics are obtained. The $Li_2O$ content is preferably 10% or less, more preferably 7% or less, still more preferably 5% or less, yet still more preferably 4% or less.

SrO is an optional component. The SrO content is preferably from 0 to 30% assuming the total of the matrix composition is 100%. By containing the SrO component, the refractive index of the glass can be increased. The SrO content is more preferably 1% or more, still more preferably 3% or more, yet still more preferably 5% or more, even yet still more preferably 10% or more. When the content is 30% or less, the devitrification temperature is lowered, and preferable production characteristics are obtained. The SrO content is more preferably 20% or less, still more preferably 15% or less, yet still more preferably 10% or less, even yet still more preferably 5% or less.

BaO is an optional component. The BaO content is preferably from 0 to 50% assuming the total of the matrix composition is 100%. By containing the BaO component, the refractive index of the glass can be increased. The content is more preferably 1% or more, still more preferably 3% or more, yet still more preferably 5% or more, even yet still more preferably 10% or more. When the content is 50% or less, the devitrification temperature is lowered, and preferable production characteristics are obtained. The BaO content is more preferably 35% or less, still more preferably 20% or less, yet still more preferably 15% or less, even yet still more preferably 10% or less.

$TiO_2$ is an optional component. The $TiO_2$ content is from 0 to 55% assuming the total of the matrix composition is 100%. When $TiO_2$ is contained, the refractive index of the glass can be increased, and the stability of the glass can be enhanced. The $TiO_2$ content is preferably 1% or more, more preferably 5% or more, still more preferably 10% or more, yet still more preferably 15% or more.

When the $TiO_2$ content is 55% or less, the devitrification temperature is lowered, and coloration of the glass is controlled. The $TiO_2$ content is preferably 35% or less, more preferably 25% or less, still more preferably 15% or less, yet still more preferably 10% or less.

$ZrO_2$ is an optional component. The $ZrO_2$ content is from 0 to 55% assuming the total of the matrix composition is 100%. When $ZrO_2$ is contained, the refractive index of the glass can be increased, and the chemical durability can be enhanced. The $ZrO_2$ content is preferably 1% or more, more preferably 5% or more, still more preferably 10% or more, yet still more preferably 15% or more.

When the $ZrO_2$ content is 55% or less, the devitrification temperature is lowered, and preferable production characteristics are obtained. The $ZrO_2$ content is preferably 30% or less, more preferably 20% or less, still more preferably 15% or less, yet still more preferably 10% or less.

$WO_3$ is an optional component. The $WO_3$ content is from 0 to 55% assuming the total of the matrix composition is 100%. When $WO_3$ is contained, the refractive index of the glass can be increased. The $WO_3$ content is preferably 1% or more, more preferably 3% or more, still more preferably 5% or more, yet still more preferably 10% or more.

When the $WO_3$ content is 55% or less, the devitrification temperature is lowered, and coloration of the glass is controlled. The $WO_3$ content is preferably 30% or less, more preferably 20% or less, still more preferably 15% or less, yet still more preferably 10% or less.

$Bi_2O_3$ is an optional component. The $Bi_2O_3$ content is from 0 to 55% assuming the total of the matrix composition is 100%. When $Bi_2O_3$ is contained, the refractive index of the glass can be increased. The $Bi_2O_3$ content is preferably 1% or more, more preferably 5% or more, still more preferably 5% or more, yet still more preferably 10% or more.

When the $Bi_2O_3$ content is 55% or less, the devitrification temperature is lowered, and coloration of the glass can is controlled. The $Bi_2O_3$ content is preferably 35% or less, more preferably 25% or less, still more preferably 15% or less, yet still more preferably 10% or less.

$TeO_2$ is an optional component. The $TeO_2$ content is from 0 to 30% assuming the total of the matrix composition is 100%. When $TeO_2$ is contained, the refractive index of the glass can be increased. The $TeO_2$ content is preferably 1% or more, more preferably 5% or more, still more preferably 10% or more, yet still more preferably 15% or more.

When the $TeO_2$ content is 55% or less, the devitrification temperature can be lowered and moreover, the material cost can be reduced. The $TeO_2$ content is preferably 30% or less, more preferably 20% or less, still more preferably 15% or less, yet still more preferably 10% or less.

By containing $Ln_2O_3$ (Ln is one or more selected from the group consisting of Y, La, Gd, Yb and Lu), the refractive index of the glass can be increased. The $Ln_2O_3$ content is preferably 1% or more, more preferably 3% or more, still more preferably 5% or more, yet still more preferably 10% or more. On the other hand, when the $Ln_2O_3$ content is 55% or less assuming the total of the matrix composition is 100%, the devitrification temperature is lowered, and preferable production characteristics are obtained. The $Ln_2O_3$ content is in total preferably 35% or less, more preferably 20% or less, still more preferably 15% or less.

Examples of the preferable composition of the $SiO_2$-based optical glass ($SiO_2$-based composition A) include a high-refractive-index glass composition containing, in mass % based on oxides, from 5 to 65% of $Nb_2O_5$, from 0 to 30% of at least one selected from the group consisting of BaO, $TiO_2$, $ZrO_2$, $WO_3$ and $Ln_2O_3$ (Ln is at least one selected from the group consisting of Y, La, Gd, Yb and Lu), from 15 to 50% of $SiO_2$, and from 2 to 20% of $Li_2O+Na_2O+K_2O$, with $Li_2O/(Li_2O+Na_2O+K_2O)$ being 0.45 or less. A specific composition of the high-refractive-index glass can further contain the following components: $B_2O_3$: from 0 to 10%, MgO: from 0 to 10%, CaO: from 0 to 15%, SrO: from 0 to 15%, BaO: from 0 to 15%, $Li_2O$: from 0 to 9%, $Na_2O$: from 0 to 10%, $K_2O$: from 0 to 10%, $Al_2O_3$: from 0 to 5%, $TiO_2$: from 0 to 15%, $WO_3$: from 0 to 15%, $ZrO_2$: from 0 to 15%, and ZnO: from 0 to 15%.

Examples of another preferable composition of the $SiO_2$-based optical glass ($SiO_2$-based composition B) include a high-refractive-index glass composition containing, in mass % based on oxides, $SiO_2$: from 25 to 40%, RO: from 0 to 10%, R'$_2$O: from 0 to 20%, $Li_2O/R'_2O$0.45, $Ln_2O_3$: from 0 to 30%, and $Nb_2O_5$: from 20 to 55%. Examples of still another preferable composition of the $SiO_2$-based optical glass ($SiO_2$-based composition C) include a high-refractive-index glass composition containing, in mass % based on oxides, $SiO_2$: from 15 to 30%, $Nb_2O_5$: from 40 to 65%, RO: from 0 to 10%, R'2O: from 0 to 20%, and $Li_2O/R'_2O$0.45. Examples of yet still another preferable composition ($SiO_2$-based composition D) include a high-refractive-index glass composition containing, in mass % based on oxides, $SiO_2$: from 25 to 40%, CaO: from 0 to 5%, $Sr_O$: from 3 to 10%, BaO: from 5 to 15%, $Li_2O$: from 4 to 8%, $Na_2O$: from 0.3 to 3%, RO>2×R'$_2$O, $Li_2O/R'_2O$: from 0.65 to 0.95, $TiO_2$: from 3 to 15%, $ZrO_2$: from 3 to 8%, and $Nb_2O_5$: from 10 to 30%. Here, RO represents the total amount of alkaline earth metal components (MgO, CaO, SrO, BaO), and R'$_2$O represents the total amount of alkali metal components ($Li_2O$, $Na_2O$, $K_2O$).

Examples of (3) the $P_2O_5$-based optical glass include a glass containing from 10 to 70 mass % of $P_2O_5$ and containing, as the high refractive index component, 1% or more of at least one selected from the group consisting of $Nb_2O_5$, $Ta_2O_5$, $Li_2O$, SrO, BaO, $TiO_2$, $ZrO_2$, $WO_3$, $Bi_2O_3$, $TeO_2$ and $Ln_2O_3$ (Ln is at least one selected from the group consisting of Y, La, Gd, Yb and Lu).

$P_2O_5$ is a glass forming component constituting the glass, and its action of imparting producible stability to the glass and reducing the glass transition temperature and liquid phase temperature is large. However, if the $P_2O_5$ content is less than 10% assuming the total of the matrix composition is 100%, sufficient effects are not obtained. The $P_2O_5$ content is preferably 15% or more, more preferably 20% or more, still more preferably 30% or more, yet still more preferably 40% or more. In addition, when the $P_2O_5$ content is 70% or less, good chemical durability is obtained. The $P_2O_5$ content is preferably 65% or less, more preferably 60% or less, still more preferably 55% or less, yet still more preferably 50% or less.

The high-refractive-index component is the same as that of (2) $SiO_2$ above and therefore, description thereof is omitted.

Furthermore, the optical glass of this embodiment contains a heat ray absorption component, in addition to the above-described matrix composition. Examples of the heat ray absorption component include $Cr_2O_3$, NiO, $Fe_2O_3$ and Pt. In this embodiment, it is sufficient if at least one of these heat ray absorption components is contained so as to satisfy the P value above.

$Cr_2O_3$ is a component having a relatively large absorption coefficient around 450 nm and 650 nm in the visible light region and also has an absorption coefficient around 550 nm and 750 nm. Accordingly, it is particularly preferable to contain this component so as to improve the heat ray absorption property.

The $Cr_2O_3$ content is, in the optical glass, preferably 0.5 ppm or more, more preferably 1 ppm or more, still more preferably 2 ppm or more, yet still more preferably 3 ppm or more. On the other hand, when the $Cr_2O_3$ content is 10 ppm or less, absorption of visible light is reduced at the time of use of wearable equipment, and internal transmittance is increased. Accordingly, the content is preferably 10 ppm or less, more preferably 8 ppm or less, still more preferably 6 ppm or less, yet still more preferably 5 ppm or less.

NiO is a component having a relatively large absorption coefficient around 450 nm in the visible light region. Accordingly, it is preferable to contain this component so as to improve the heat ray absorption property.

The NiO content is, in the optical glass, preferably 0.5 ppm or more, more preferably 1 ppm or more, still more preferably 2 ppm or more, yet still more preferably 3 ppm or more. On the other hand, when the NiO content is 10 ppm or less, absorption of visible light is reduced at the time of use of wearable equipment, and internal transmittance is increased. Accordingly, the content is preferably 10 ppm or less, more preferably 8 ppm or less, still more preferably 6 ppm or less, yet still more preferably 5 ppm or less.

$Fe_2O_3$ is a component having an absorption coefficient around 450 nm in the visible light region. The absorption coefficient of $Fe_2O_3$ is low as the heat ray absorption component in this embodiment, but since this component is unavoidably contained in the glass and its content is relatively large, the heat ray absorption property can be improved.

The $Fe_2O_3$ content is, in terms of total $Fe_2O_3$, in the optical glass, preferably 2 ppm or more, more preferably 4 ppm or more, still more preferably 7 ppm or more, yet still more preferably 10 ppm or more. On the other hand, when the $Fe_2O_3$ content is 40 ppm or less, absorption of visible light is reduced at the time of use of wearable equipment, and internal transmittance is increased. Accordingly, the content is preferably 40 ppm or less, more preferably 35 ppm or less, still more preferably 30 ppm or less, yet still more preferably 25 ppm or less.

Pt is a component having a relatively large absorption coefficient around 450 nm in the visible light region and also has an absorption coefficient around 550 nm. Accordingly, this is a preferable component for improving the heat ray absorption property.

The Pt content is, in the optical glass, preferably 0.5 ppm or more, more preferably 1 ppm or more, still more preferably 2 ppm or more, yet still more preferably 3 ppm or more. On the other hand, when the Pt content is 10 ppm or less, absorption of visible light is reduced at the time of use of wearable equipment, and internal transmittance is increased. Accordingly, the content is preferably 10 ppm or less, more preferably 6 ppm or less, still more preferably 4 ppm or less, yet still more preferably 2 ppm or less.

However, these heat ray absorption components are generally a colored component and serve also as a component of decreasing the internal transmittance. Therefore, their blending is performed while avoiding excessively containing these components.

Furthermore, it is preferable that the optical glass of this embodiment contains at least one of $Sb_2O_3$ and $SnO_2$. These are not an essential component but can be added for the purpose of, for example, adjusting the refractive index property, enhancing the meltability, controlling coloration, increasing the transmittance, and improving the clarity and chemical durability. In the case where these components are contained, the content thereof is in total preferably 5% or less, more preferably 3% or less, still more preferably 1% or less, yet still more preferably 0.5% or less.

In the glass substrate of this embodiment, a film such as antireflection film, reflective film, ultraviolet absorbing film and infrared absorbing film may be provided on at least one main surface of the glass substrate. These films may be provided only on one main surface of the glass substrate or may be provided on both main surfaces.

All of these films may be a known film. For example, the antireflection film includes a film formed by depositing, as a single layer, a material having a lower refractive index than the glass substrate, a film having a configuration where a high-refractive-index film and a low-refractive-index film are alternately stacked, etc. The high-refractive-index film as used herein is a film having a refractive index of 1.9 or more at a wavelength of 550 nm, and the low-refractive-index layer film is a film having a refractive index of 1.6 or less at a wavelength of 550 nm.

[Optical Glass and Production Method of Glass Molded Body]

The optical glass of this embodiment is produced, for example, as follows.

First, raw materials are weighed to give the predetermined glass composition above and uniformly mixed. The obtained raw material mixture is charged into a continuous melting furnace and heated by a burner to melt the raw material mixture and after homogenization by defoaming, stirring, etc., the melt is flowed out from the continuous melting furnace, cooled and solidified to obtain the optical glass of this embodiment.

Furthermore, the optical glass can be made into a glass plate by forming the molten glass into a plate shape by a forming method such as float method, fusion method and roll-out method. In addition, a glass molded body can be fabricated using means such as reheat press molding or precise press molding. More specifically, a lens preform for a mold-press molding is fabricated from the optical glass, and this lens preform may be subjected to reheat press molding and then polishing to fabricate the glass molded product, or for example, the lens preform fabricated by polishing may be subjected to precise press molding to fabricate the glass molded product. The means to fabricate the glass molded product is not limited to these means.

As for the melting method, the continuous melting method described above is suitable, but other than this method, the optical glass may also be obtained by a conventional known method. For example, a mixture obtained by mixing raw materials may be put in a platinum crucible, a quartz crucible or an alumina crucible and roughly melted. After that, the melt may be put in a gold crucible, a platinum crucible, a platinum alloy crucible, a reinforced platinum crucible or an iridium crucible, melted at a temperature ranging from 1,200 to 1,400° C. for 2 to 10 hours, homogenized by defoaming, stirring, etc. to effect foam breaking, etc., then cast on a metal mold, and slowly cooled to obtain the optical glass.

An optical member such as the thus-fabricated glass plate or glass molded body is useful for various optical elements and, among others, is suitably used for (1) wearable equipment, for example, glasses with projector, a glasses-type or goggle-type display, a light guide used for a virtual reality and augmented reality display device, a virtual image display device, etc., a filter, and a lens, and (2) a lens, a cover glass, etc. used for a vehicle-mounted camera or a robots' visual sensor. Even in applications exposed to severe environment, such as vehicle-mounted camera, the optical member is suitably used. In addition, the optical member is also suitably used for applications such as organic EL glass substrate, wafer level lens array substrate, lens unit substrate, lens forming substrate by an etching method, and optical waveguide.

The optical glass of this embodiment described hereinabove has a high refractive index, a low density, and good production characteristics and is suitable as an optical glass for wearable equipment, for vehicle mounting, and for robot mounting.

EXAMPLES

Raw materials were weighed to give the chemical composition (mass % in terms of oxides) shown in Tables 1 to 3. As for all of raw materials, a high-purity raw material used for a normal optical glass, such as oxide, hydroxide, carbonate, nitrate, fluoride, hydroxide and metaphosphoric acid compound each corresponding to the raw material of each component, were selected and used. As for the refining agent ($Sb_2O_3$) and heat ray absorption component, after adding them in the form of an oxide, the content of the component in the obtained glass was analyzed by ICP mass spectrometry, and a value obtained as a mass ratio thereof to the entire optical glass is shown. As for Pt, the Pt element was analyzed by ICP mass spectrometry, and a value obtained as a mass ratio thereof to the entire optical glass is shown. Pt includes Pt eluted from the platinum vessel used for melting. The trace component using ICP mass spectrometry was determined by the ICP mass spectrometer (Agilent 8800) manufactured by Agilent Technologies. As for the heat ray absorption component, components mixed from an SUS member, etc. in the production line also exhibit the same effect as the intentionally added component above.

The weighed raw materials were uniformly mixed, put in a platinum vessel, melted at about 1,400° C. for about 5 hours, clarified, stirred, then cast on a rectangular mold of 50 mm (length)×100 mm (width) preheated at approximately 650° C., and slowly cooled at about 1° C./min to obtain samples of Examples 1 to 19.

[Properties]

Each of the samples obtained above was measured for the glass transition temperature (Tg), coefficient of thermal expansion ($\alpha$), specific gravity (d), refractive index ($n_d$), internal transmittance, absorbance, and P value as follows. The obtained results are shown together in Tables 1 and 2. The blank column indicates an unmeasured property.

Glass Transition Temperature (Tg):

A value (° C.) measured using a differential dilatometer (TMA); this was determined according to JIS R3103-3 (2001).

Coefficient of Thermal Expansion ($\alpha$):

Linear coefficient of thermal expansions in the range of 30 to 350° C. were measured using a differential dilatometer (TMA), and an average linear coefficient of thermal expansion ($\times 10^{-7}$/K) in the range of 30 to 350° C. was determined according to JIS R3102 (1995).

Specific Gravity (d):

Measured in conformity with JIS Z8807 (1976, measuring method where weighting is performed in liquid).

Refractive Index ($n_d$):

The sample glass was processed into a triangle-shaped prism having a thickness of 10 mm with one side being 30 mm and measured by a refractometer (manufactured by Kalnew Corporation, device name: KPR-2000).

Internal Transmittance·Absorbance:

Transmittances $T_{1\ mm}$ and $T_{10\ mm}$ of samples having a thickness of 1 mm and a thickness of 10 mm, respectively, were measured at each measurement wavelength of wavelengths 450 nm, 550 nm, 650 nm and 750 nm., The internal transmittance and absorbance at each measurement wavelength were calculated using formula (2) from these transmittances. The measurement of the transmittance was performed using a spectrophotometer (manufactured by Hitachi High-Technologies Corporation, U-4100).

P Value:

The P value was calculated according to formula (1) for the optical glass of each Example from the absorbance obtained by the measurement above and the radiance at wavelengths 450 nm, 550 nm, 650 nm and 750 nm in the Planck's radiation law (1,300° C.).

TABLE 1

| (mass %) | | Ex. 1 | Ex. 2 | Ex. 3 | Ex. 4 | Ex. 5 | Ex. 6 | Ex. 7 |
|---|---|---|---|---|---|---|---|---|
| Matrix composition | $SiO_2$ | 34 | 34 | 34 | 34 | 34 | 34 | 34 |
| | $B_2O_3$ | 1 | 1 | 1 | 1 | 1 | 1 | 1 |
| | MgO | | | | | | | |
| | CaO | | | | | | | |
| | SrO | | | | | | | |
| | BaO | | | | | | | |
| | $Li_2O$ | 3 | 3 | 3 | 3 | 3 | 3 | 3 |
| | $Na_2O$ | 4 | 4 | 4 | 4 | 4 | 4 | 4 |
| | $K_2O$ | 4 | 4 | 4 | 4 | 4 | 4 | 4 |
| | $Al_2O_3$ | | | | | | | |
| | $TiO_2$ | | | | | | | |
| | $Nb_2O_5$ | 50 | 50 | 50 | 50 | 50 | 50 | 50 |
| | $La_2O_3$ | | | | | | | |
| | $ZrO_2$ | 4 | 4 | 4 | 4 | 4 | 4 | 4 |
| | $Y_2O_3$ | | | | | | | |
| | ZnO | | | | | | | |
| | Total | 100 | 100 | 100 | 100 | 100 | 100 | 100 |
| Refining agent (ppm) | $Sb_2O_3$ | 2000 | 2000 | 2000 | 2000 | 2000 | 2000 | 2000 |
| | $Fe_2O_3$ | 2.3 | 2.4 | 2.2 | 2.2 | 5.0 | 4.0 | 2.5 |
| Heat ray absorption component (ppm) | $Cr_2O_3$ | 0.4 | | 5.0 | | | 1.1 | |
| | NiO | | | | 5.0 | | 0.6 | |
| | Pt | 0.4 | 5.1 | 5.3 | 5.5 | 6.7 | | 6.6 |
| Glass transition temperature (Tg) | | 590 | 590 | 590 | 590 | 590 | 590 | 590 |
| Coefficient of thermal expansion ($\alpha$) | | 80 | 80 | 80 | 80 | 80 | 80 | 80 |
| Specific gravity (d) | | 3.30 | 3.30 | 3.30 | 3.30 | 3.30 | 3.30 | 3.30 |
| Refractive index ($n_d$) | | 1.78 | 1.78 | 1.78 | 1.78 | 1.78 | 1.78 | 1.78 |
| Internal transmittance (%) | 450 nm | 98.5 | 95.3 | 92.4 | 92.4 | 93.3 | 97.8 | 93.8 |
| | 550 nm | 99.7 | 99.3 | 98.7 | 99.1 | 99.0 | 99.8 | 99.1 |
| | 650 nm | 99.8 | 99.9 | 97.8 | 100.1 | 99.9 | 99.4 | 99.9 |
| | 750 nm | 99.9 | 100.0 | 99.3 | 100.1 | 100.0 | 99.7 | 100.0 |
| Absorbance | 450 nm | 0.0066 | 0.0209 | 0.0343 | 0.0341 | 0.0300 | 0.0096 | 0.0280 |
| | 550 nm | 0.0012 | 0.0030 | 0.0055 | 0.0040 | 0.0046 | 0.0009 | 0.0040 |
| | 650 nm | 0.0010 | 0.0003 | 0.0096 | −0.0004 | 0.0004 | 0.0025 | 0.0004 |
| | 750 nm | 0.0002 | 0.0000 | 0.0031 | −0.0004 | −0.0002 | 0.0013 | −0.0001 |
| P value | | 7.5 | 7.6 | 8.4 | 7.6 | 7.7 | 7.9 | 7.7 |

TABLE 2

| (mass %) | | Ex. 8 | Ex. 9 | Ex. 10 | Ex. 11 | Ex. 12 | Ex. 13 |
|---|---|---|---|---|---|---|---|
| Matrix composition | $SiO_2$ | 34 | 4 | 4 | 35 | 31 | 14 |
| | $B_2O_3$ | 1 | 30 | 30 | 1 | 3 | 24 |
| | MgO | | | | | | |
| | CaO | | | | | 17 | 6 |
| | SrO | | | | | | |
| | BaO | | | | 3 | 14 | 10 |
| | $Li_2O$ | 3 | | | 6 | 4 | |
| | $Na_2O$ | 4 | | | 4 | | |
| | $K_2O$ | 4 | | | | | |
| | $Al_2O_3$ | | | | | | |
| | $TiO_2$ | | | | | 15 | 23 |
| | $Nb_2O_5$ | 50 | 1 | 1 | 47 | 6 | 3 |
| | $La_2O_3$ | | 45 | 45 | | 6 | 14 |
| | $ZrO_2$ | 4 | 9 | 9 | 4 | 6 | 6 |
| | $Y_2O_3$ | | 11 | 11 | | | |
| | ZnO | | | 1 | 0 | | |
| | Total | 100 | 100 | 100 | 100 | 100 | 100 |
| Refining agent (ppm) | $Sb_2O_3$ | 2000 | 2000 | 2000 | 2000 | 2000 | 2000 |
| | $Fe_2O_3$ | 12.5 | 100.0 | 1.3 | 2.5 | 2.4 | 2.2 |
| Heat ray absorption component (ppm) | $Cr_2O_3$ | | | 10.0 | 10.0 | | |
| | NiO | | | | | | |
| | Pt | 5.1 | 3.0 | 3.0 | 5.0 | 5.1 | 5.1 |

TABLE 2-continued

| (mass %) | | Ex. 8 | Ex. 9 | Ex. 10 | Ex. 11 | Ex. 12 | Ex. 13 |
|---|---|---|---|---|---|---|---|
| Glass transition temperature (Tg) | | 590 | 655.0 | 655.0 | 589.0 | 646.6 | 657.8 |
| Coefficient of thermal expansion ($\alpha$) | | 80 | 73.0 | 73.0 | 85.0 | 93.5 | 92.7 |
| Specific gravity (d) | | 3.30 | 4.3 | 4.3 | 3.3 | 4.3 | 4.5 |
| Refractive index ($n_d$) | | 1.78 | 1.8 | 1.8 | 1.8 | 1.88 | 1.91 |
| Internal transmittance (%) | 450 nm | 95.4 | 93.0 | 92.4 | 91.9 | 94.2 | 91.8 |
| | 550 nm | 99.2 | 99.5 | 96.0 | 98.9 | 99.7 | 98.7 |
| | 650 nm | 99.8 | 99.6 | 94.4 | 97.1 | 99.8 | 99.1 |
| | 750 nm | 100.0 | 98.3 | 97.3 | 99.2 | 100.0 | 99.7 |
| Absorbance | 450 nm | 0.0203 | 0.0316 | 0.0345 | 0.0367 | 0.0259 | 0.0372 |
| | 550 nm | 0.0034 | 0.0023 | 0.0177 | 0.0047 | 0.0014 | 0.0055 |
| | 650 nm | 0.0010 | 0.0017 | 0.0248 | 0.0129 | 0.0010 | 0.0038 |
| | 750 nm | 0.0000 | 0.0075 | 0.0117 | 0.0037 | −0.0009 | 0.0014 |
| P value | | 7.7 | 8.4 | 8.9 | 8.5 | 7.4 | 8.2 |

TABLE 3

| (mass %) | | Ex. 14 | Ex. 15 | Ex. 16 | Ex. 17 | Ex. 18 | Ex. 19 |
|---|---|---|---|---|---|---|---|
| Matrix composition | $SiO_2$ | 51 | 51 | 51 | 41 | 34 | 31 |
| | $B_2O_3$ | 9 | 9 | 9 | 5 | 7 | 7 |
| | MgO | | | | | | 1 |
| | CaO | 6 | 6 | 6 | 3 | 3 | 6 |
| | SrO | 7 | 7 | 7 | 11 | 6 | 4 |
| | BaO | 11 | 11 | 11 | 25 | 27 | 28 |
| | $Li_2O$ | 7 | 7 | 7 | | | |
| | $Na_2O$ | 2 | 2 | 2 | | | |
| | $K_2O$ | | | | | | |
| | $Al_2O_3$ | 4 | 4 | 4 | 5 | 3 | 2 |
| | $TiO_2$ | | | | 5 | 6 | 10 |
| | $Nb_2O_5$ | | | | | | |
| | $La_2O_3$ | | | | | 11 | 10 |
| | $ZrO_2$ | | | | 2 | 1 | 1 |
| | $Y_2O_3$ | | | | | | |
| | ZnO | 3 | 3 | 3 | 3 | 2 | |
| | Total | 100 | 100 | 100 | 100 | 100 | 100 |
| Refining agent (ppm) | $Sb_2O_3$ | <50 | <50 | <50 | | | |
| Heat ray absorption component (ppm) | $Fe_2O_3$ | 28.0 | 150.0 | 25.0 | 100.0 | 10.0 | 40.0 |
| | $Cr_2O_3$ | | | | 1.0 | 1.0 | 2.0 |
| | NiO | | | | | | |
| | Pt | 4.0 | 7.0 | 19.0 | | | |
| Glass transition temperature (Tg) | | 500 | 500 | 500 | | | |
| Coefficient of thermal expansion ($\alpha$) | | | | | 71 | 78 | 80 |
| Specific gravity (d) | | | | | 3.38 | 3.64 | 3.63 |
| Refractive index ($n_d$) | | 1.58 | 1.58 | 1.58 | 1.63 | 1.67 | 1.70 |
| Internal transmittance (%) | 450 nm | 95.4 | 97.2 | 94.5 | | | |
| | 550 nm | 97.0 | 100.0 | 97.0 | 93.0 | 90.0 | 82.0 |
| | 650 nm | 97.3 | 99.9 | 97.3 | | | |
| | 750 nm | 98.3 | 99.8 | 98.3 | | | |
| Absorbance | 450 nm | 0.0204 | 0.0124 | 0.0244 | | | |
| | 550 nm | 0.0130 | 0.0000 | 0.0130 | | | |
| | 650 nm | 0.0118 | 0.0006 | 0.0118 | | | |
| | 750 nm | 0.0076 | 0.0007 | 0.0076 | | | |
| P value | | 8.6 | 7.6 | 8.6 | | | |

In all of optical glasses of Examples (Examples 1 to 13), the refractive index ($n_d$) is 1.64 or more and is a high refractive index. In addition, in these optical glasses, the P value is in the range of from 7 to 10. Therefore, the production characteristics are good. Furthermore, the internal transmittance at 450 to 750 nm is 91% or more. Therefore, these optical glasses are suitable as an optical glass used for wearable equipment, vehicle-mounted camera and robot's visual sense.

On the other hand, in Comparative Examples, the glasses of Examples 14 to 17 have a poor refractive index, and the glasses of Examples 18 and 19 have a good refractive index but have a slightly poor internal transmittance.

As understood from these, the optical glass of Examples of the present invention have a high refractive index, a low density, and good production characteristics and is suitable as an optical glass for wearable equipment, for vehicle mounting, for robot mounting, etc.

The invention claimed is:

1. An optical glass having a refractive index ($n_d$) of 1.64 or more, wherein a P value represented by the following formula (1) is in a range of 7.0<P value<10.0:

$$P \text{ value} = \log(A_{450} \times P_{450} + A_{550} \times P_{550} + A_{650} \times P_{650} A_{750} \times P_{750}) \quad (1),$$

provided that $A_{450}$ is an absorbance of the optical glass with a plate thickness of 10 mm at a wavelength of 450 nm, $P_{450}$ is a radiance of light having a wavelength of 450 nm at 1,300° C. according to Planck's radiation law, $A_{550}$ is an absorbance of the optical glass with a plate thickness of 10 mm at a wavelength of 550 nm, $P_{550}$ is a radiance of light having a wavelength of 550 nm at 1,300° C. according to Planck's radiation law, $A_{650}$ is an absorbance of the optical glass with a plate thickness of 10 mm at a wavelength of 650 nm, $P_{650}$ is a radiance of light having a wavelength of 650 nm at 1,300° C. according to Planck's radiation law, $A_{750}$ is an absorbance of the optical glass with a plate thickness of 10 mm at a wavelength of 750 nm, and $P_{750}$ is a radiance of light at 1,300° C. at a wavelength of 750 nm according to Planck's radiation law, wherein all of internal transmittances in terms of a 10-mm thickness at wavelengths of 450 nm, 550 nm, 650 nm and 750 nm are 91% or more, wherein the optical glass is a $P_2O_5$-based optical glass, and wherein the optical glass comprises $Fe_2O_3$ as the heat ray absorption component, wherein a content of $Fe_2O_3$ in the optical glass is from 2 to 40 ppm by mass.

2. The optical glass according to claim 1, which satisfies at least one of the following requirements:
the absorbance $A_{450}$ being in a range of $0.025<A_{450}<1.000$,
the absorbance $A_{550}$ being in a range of $0.003<A_{550}<0.500$,
the absorbance $A_{650}$ being in a range of $0.003<A_{650}<0.500$, and
the absorbance $A_{750}$ being in a range of $0.003<A_{750}<0.500$.

3. The optical glass according to claim 1, further comprising at least one heat ray absorption component selected from $Cr_2O_3$, NiO, and Pt.

4. The optical glass according to claim 3, comprising $Cr_2O_3$ as the heat ray absorption component, wherein a content of $Cr_2O_3$ in the optical glass is from 0.5 to 10 ppm by mass.

5. An optical glass having a refractive index ($n_d$) of 1.64 or more, wherein a P value represented by the following formula (1) is in a range of 7.0<P value<10.0:

$$P \text{ value}=\log(A_{450} \times P_{450}+A_{550} \times P_{550}+A_{650} \times P_{650} A_{750} \times P_{750}) \quad (1),$$

provided that $A_{450}$ is an absorbance of the optical glass with a plate thickness of 10 mm at a wavelength of 450 nm, $P_{450}$ is a radiance of light having a wavelength of 450 nm at 1,300° C. according to Planck's radiation law, $A_{550}$ is an absorbance of the optical glass with a plate thickness of 10 mm at a wavelength of 550 nm, $P_{550}$ is a radiance of light having a wavelength of 550 nm at 1,300° C. according to Planck's radiation law, $A_{650}$ is an absorbance of the optical glass with a plate thickness of 10 mm at a wavelength of 650 nm, $P_{650}$ is a radiance of light having a wavelength of 650 nm at 1,300° C. according to Planck's radiation law, $A_{750}$ is an absorbance of the optical glass with a plate thickness of 10 mm at a wavelength of 750 nm, and $P_{750}$ is a radiance of light at 1,300° C. at a wavelength of 750 nm according to Planck's radiation law, wherein all of internal transmittances in terms of a 10-mm thickness at wavelengths of 450 nm, 550 nm, 650 nm and 750 nm are 91% or more, and wherein the optical glass comprises NiO as a heat ray absorption component, wherein a content of NiO in the optical glass is from 0.5 to 10 ppm by mass.

6. The optical glass according to claim 3, comprising Pt as the heat ray absorption component, wherein a content of Pt in the optical glass is from 0.5 to 10 ppm by mass.

7. The optical glass according to claim 1, having a matrix composition of a glass constituting the optical glass, the glass matrix comprising, in mass % based on oxides:
as a glass forming component, at least one selected from the group consisting of from 5 to 80 mass % of $SiO_2$, from 5 to 80 mass % of $B_2O_3$ and from 30 to 80 mass % of $P_2O_5$,
as a modifier oxide, 5 to 70 mass % in a total amount of at least one oxide selected from the group consisting of MgO, CaO, SrO, BaO, ZnO, $Li_2O$, $Na_2O$, $K_2O$, $Cs_2O$ and $Ln_2O_3$ (Ln is at least one selected from the group consisting of Y, La, Gd, Yb and Lu), and
as an intermediate oxide, 0 to 50 mass % in a total amount of at least one oxide selected from the group consisting of $Al_2O_3$, $TiO_2$, $ZrO_2$, $WO_3$, $Bi_2O_3$, $TeO_2$, $Ta_2O_5$ and $Nb_2O_5$.

8. The optical glass according to claim 1, having a glass transition temperature (Tg) of from 500 to 700° C. and a coefficient of thermal expansion ($\alpha$) at 50 to 350° C. of from 50 to 150 ($\times 10^{-7}$/K).

9. The optical glass according to claim 1, which is a plate shape having a thickness of 0.01 to 2 mm.

10. The optical glass according to claim 1, having one main surface with an area of 8 $cm^2$ or more.

11. An optical component comprising the optical glass having a plate shape according to claim 9.

12. The optical component according to claim 11, comprising an antireflection film on a surface of the optical glass having a plate shape.

13. The optical glass according to claim 1, wherein the optical glass comprises from 30 to 70 mass % of $P_2O_5$.

14. The optical glass according to claim 5, wherein the optical glass is a $P_2O_5$-based optical glass.

15. The optical glass according to claim 14, wherein the optical glass comprises from 10 to 70 mass % of $P_2O_5$.

16. The optical glass according to claim 5, which satisfies at least one of the following requirements:
the absorbance $A_{450}$ being in a range of $0.025<A_{450}<1.000$,
the absorbance $A_{550}$ being in a range of $0.003<A_{550}<0.500$,
the absorbance $A_{650}$ being in a range of $0.003<A_{650}<0.500$, and
the absorbance $A_{750}$ being in a range of $0.003<A_{750}<0.500$.

17. The optical glass according to claim 5, having a matrix composition of a glass constituting the optical glass, the glass matrix comprising, in mass % based on oxides:
as a glass forming component, from 5 to 80 mass % of at least one selected from the group consisting of $SiO_2$, $B_2O_3$ and $P_2O_5$,
as a modifier oxide, 5 to 70 mass % in a total amount of at least one oxide selected from the group consisting of MgO, CaO, SrO, BaO, ZnO, $Li_2O$, $Na_2O$, $K_2O$, $Cs_2O$ and $Ln_2O_3$ (Ln is at least one selected from the group consisting of Y, La, Gd, Yb and Lu), and
as an intermediate oxide, 0 to 50 mass % in a total amount of at least one oxide selected from the group consisting of $Al_2O_3$, $TiO_2$, $ZrO_2$, $WO_3$, $Bi_2O_3$, $TeO_2$, $Ta_2O_5$ and $Nb_2O_5$.

18. The optical glass of claim 5, wherein the optical glass has a glass transition temperature (Tg) of from 500 to 700° C. and a coefficient of thermal expansion ($\alpha$) at 50 to 350° C. of from 50 to 150 ($\times 10^{-7}$/K).

19. The optical glass according to claim 5, which is a plate shape having a thickness of 0.01 to 2 mm.

* * * * *